United States Patent
Appusamy et al.

(10) Patent No.: US 10,360,141 B2
(45) Date of Patent: Jul. 23, 2019

(54) AUTOMATED APPLICATION TEST SYSTEM

(71) Applicant: BARCLAYS BANK PLC, London (GB)

(72) Inventors: Rameshkumar Appusamy, Pune (IN); Shrinivas Kulkarni, Pune (IN)

(73) Assignee: BARCLAYS SERVICES LIMITED, London (GB)

( * ) Notice: Subject to any disclaimer, the term of this patent is extended or adjusted under 35 U.S.C. 154(b) by 0 days.

(21) Appl. No.: 14/910,537

(22) PCT Filed: Aug. 5, 2014

(86) PCT No.: PCT/GB2014/052395
§ 371 (c)(1),
(2) Date: Feb. 5, 2016

(87) PCT Pub. No.: WO2015/019074
PCT Pub. Date: Feb. 12, 2015

(65) Prior Publication Data
US 2016/0188450 A1    Jun. 30, 2016

(30) Foreign Application Priority Data

Aug. 6, 2013  (IN) .......................... 2597/MUM/2013
Sep. 24, 2013 (GB) .................................. 1316964.4

(51) Int. Cl.
*G06F 11/00* (2006.01)
*G06F 11/36* (2006.01)
*H04L 29/08* (2006.01)

(52) U.S. Cl.
CPC ...... *G06F 11/3688* (2013.01); *G06F 11/3664* (2013.01); *H04L 67/10* (2013.01)

(58) Field of Classification Search
CPC ... G06F 11/3688; G06F 11/3664; H04L 67/10
(Continued)

(56) References Cited

U.S. PATENT DOCUMENTS

| 6,421,822 B1 | 7/2002 | Pavela |
| 7,334,162 B1 * | 2/2008 | Vakrat ................. G06F 11/2294 714/38.1 |

(Continued)

FOREIGN PATENT DOCUMENTS

| EP | 1872228 A2 | 1/2008 |
| EP | 2605141 A1 | 6/2013 |

(Continued)

OTHER PUBLICATIONS

Wikipedia "test suite" page from date Aug. 28, 2013, retrieved using the way back machine from http://web.archive.org/web/20130628183012/https://en.wikipedia.org/wiki/Test_suite.*

(Continued)

*Primary Examiner* — Yair Leibovich
(74) *Attorney, Agent, or Firm* — Foley & Lardner LLP

(57) ABSTRACT

An automated application test system comprises a plurality of clients (3) providing test interfaces to corresponding users, and a network of test nodes (4a) connected to the clients (3); wherein each said test node (4a) comprises one or more test devices locally connected to the test node (4a); and an agent (6) arranged to execute one or more test applications on the locally connected test devices (4b) in accordance with requests from the clients (3).

13 Claims, 9 Drawing Sheets

(58) Field of Classification Search
USPC .................................................... 714/38.1
See application file for complete search history.

(56) References Cited

U.S. PATENT DOCUMENTS

| | | | |
|---|---|---|---|
| 7,603,658 B2 | 10/2009 | Subramanian et al. | |
| 7,810,070 B2 | 10/2010 | Nasuti et al. | |
| 7,870,504 B1 | 1/2011 | McIntosh et al. | |
| 7,881,491 B2 | 2/2011 | Mizrachi | |
| 7,917,895 B2 | 3/2011 | Givoni et al. | |
| 8,254,908 B2 | 8/2012 | Lee | |
| 10,013,338 B2* | 7/2018 | Leclair | G06F 9/44 |
| 2004/0153823 A1* | 8/2004 | Ansari | G06F 11/0715 |
| | | | 714/38.14 |
| 2006/0165040 A1* | 7/2006 | Rathod | G06Q 10/10 |
| | | | 370/335 |
| 2007/0277154 A1 | 11/2007 | Badwe | |
| 2008/0139195 A1 | 6/2008 | Marsyla et al. | |
| 2008/0244524 A1 | 10/2008 | Kelso | |
| 2009/0019315 A1 | 1/2009 | Belvin | |
| 2010/0275061 A1 | 10/2010 | Lee | |
| 2011/0214107 A1 | 9/2011 | Barmeir et al. | |
| 2012/0054756 A1* | 3/2012 | Arnold | G06F 9/4881 |
| | | | 718/102 |
| 2013/0019242 A1* | 1/2013 | Chen | H04L 41/145 |
| | | | 718/1 |
| 2013/0179858 A1 | 7/2013 | Mecke | |
| 2013/0219226 A1* | 8/2013 | Hachmeister | G06F 11/3672 |
| | | | 714/38.1 |

FOREIGN PATENT DOCUMENTS

| | | |
|---|---|---|
| WO | 2012/049376 A1 | 4/2012 |
| WO | 2012/111387 A1 | 8/2012 |

OTHER PUBLICATIONS

Huang & Gong; "Remote Mobile Test System: A Mobile Phone Cloud for Application Testing"; IEEE 4th International Conference on Cloud Computing Technology and Science, pp. 587-590; 2012.
International Search Report dated Nov. 12, 2014, which is enclosed, that issued in the corresponding International Patent Application No. PCT/GB2014/052395.
International Preliminary Report on Patentability in International Application No. PCT/GB2014/052395 dated Feb. 9, 2016 (9 pages).
International Search Report and Written Opinion in International Application No. PCT/GB2017/052395 dated Dec. 11, 2014 (11 pages).

* cited by examiner

FIG. 5

```
#-------------------------------------------------
activeDevice =ios_app:ipad
suite=com.Application.iBOC.UK.iPad
dataPath=C:\\workArea\\iBOC\\iBOC\\iBOC DataSheet.xls
#-------------------------------------------------
host = 127.0.0.1
port = 8888
projectBaseDirectory=C:\\workArea\\iBOC\\iBOC\\
reportpath=C:\\Reports\\
applicationName=BMB UK
applicationTechnicalName=launchBMB
environment=sit3
GUIMap=C:\\workArea\\iBOC\\iBOC\\GUIMap.xml
Debug=true
timeout=20
screentimeout=5
debugmode=true
prompt=false
#-------------------------------------------------
speakmessage=false
voiceflow=C:\\workArea\\iBOC\\iBOC\\Voice flow 1.xls
#-------------------------------------------------
```

FIG. 6

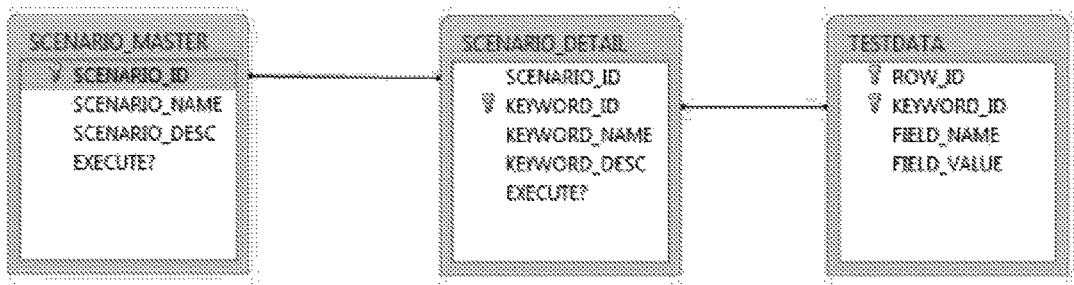

FIG. 7

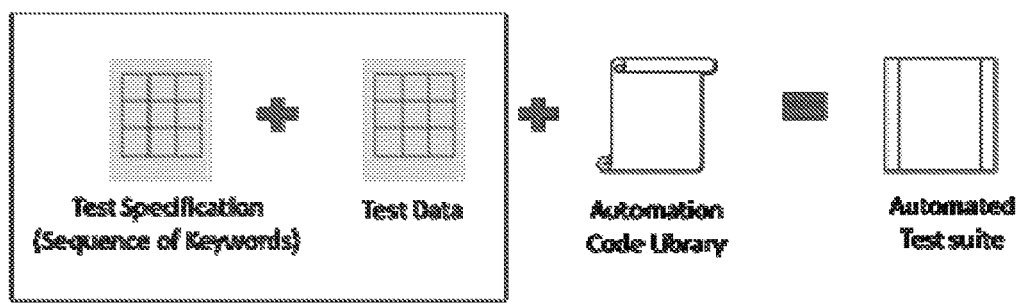

AUTOMATED APPLICATION TEST SYSTEM

CROSS-REFERENCE TO RELATED APPLICATIONS

This application claims priority to International Application No. PCT/GB2014/052395, filed on Aug. 5, 2014, and IN Application No. 2597/MUM/2013, filed Aug. 6, 2013 and GB Application No. 1316964.4, filed Sep. 24, 2013, the entire disclosures of which are hereby incorporated by reference.

FIELD OF THE INVENTION

This invention relates to an automated method and system for testing applications, particularly but not exclusively in a mobile environment.

BACKGROUND OF THE INVENTION

A large number of different types of mobile device are in common use, so it is necessary to test a mobile application before launch on many different types of mobile device, having for example different operating systems, user input methods and screen resolutions. This can be time-consuming, and potentially requires a large inventory of different mobile devices on which the application is to be tested. The devices to be tested may vary depending on the application, the user and/or the development cycle.

Commercial solutions to mobile application testing include KeyNote Device AnyWhere™ and Mobile Cloud from Perfecto Mobile™. These allow automated testing of mobile applications on mobile devices operated by the service provider.

STATEMENT OF THE INVENTION

Different aspects of the present invention are defined in the independent method claims. In other aspects, there is provided a method of operating the system as described above. In another aspect, there is provided a computer program arranged to carry out the method when executed by suitable programmable devices.

Advantages of embodiments of the invention are described below in the description of specific embodiments.

BRIEF DESCRIPTION OF THE DRAWINGS

There now follows, by way of example only, a detailed description of embodiments of the present invention, with references to the figures identified below.

FIG. 5 shows a sample configuration file for an automated test in an embodiment of the invention.

FIG. 6 shows a test specification and data model for the test execution system.

FIG. 7 is a schematic diagram of the elements of an automated test suite.

DETAILED DESCRIPTION OF THE EMBODIMENTS

Overview

An embodiment of the invention comprises a multi-tier test execution system operable with both mobile and non-mobile applications, and with related automation tools. A mobile application is one that is intended to be executed on a mobile device, for example a smartphone such as an iOS™, Blackberry™ or Android™ based smartphone, a tablet computer, a 'feature' phone, a personal digital assistant (PDA), or any processor-powered device with suitable input and display means.

In addition to the conventional 3-tier architecture, the system comprises an additional, dynamically scalable cloud layer of mobile devices and associated nodes, which may comprise general-purpose computers. At the client layer, users may create automated tests, select devices and/or nodes to run these tests, and trigger the tests remotely. The cloud layer is divisible into segments under control of the users.

A software agent may run at each node. A test automation suite may be integrated with each node by means of the agent.

Components of the system at the application server and database layers may store and manage user sessions and user profiles.

System Architecture

Figure 1:
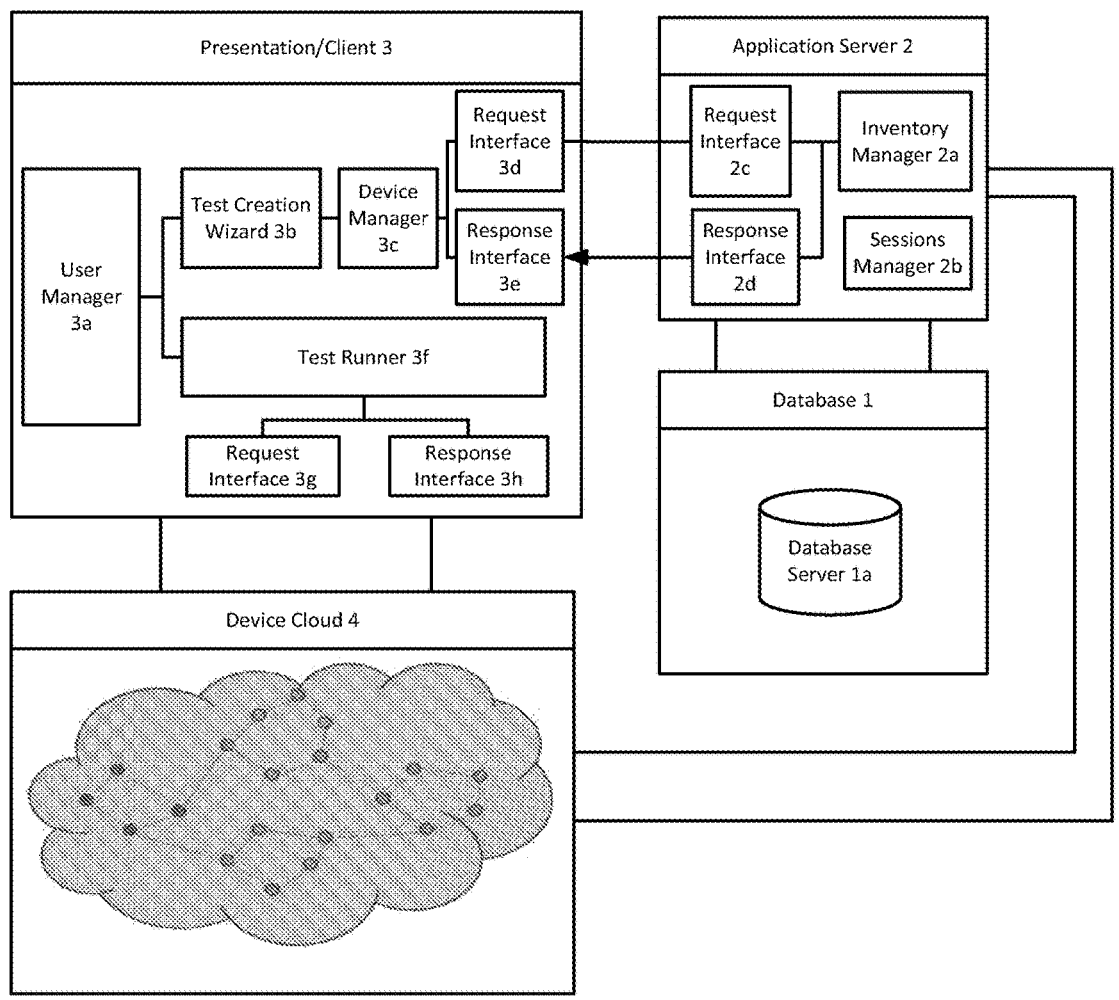
FIG. 1 is a high-level architecture diagram of a test execution system in an embodiment of the invention.

FIG. 1 shows the architecture of a test execution system in an embodiment of the invention, comprising the following tiers: database 1, application server 2, presentation/client 3 and device cloud 4.

Client Application

The client 3 is the main interface for users of the system, and comprises one or more client applications having the following functional components. A user manager 3*a* provides an interface between the user and the available test functions. A test creation wizard 3*b* allows the user to configure an automated test for execution on specified devices, managed by a device manager 3*c*. A test runner 3*f* allows the user to trigger a specified test on the device cloud 4, by means of a request interface 3*g* and a response interface 3*h*. Once the test is triggered, the user can monitor the progress of the test execution using a log and optionally a screen stream, as described in more detail below. The user may also schedule and abort tests from the client 3.

The client 3 also provides administrative features for group profile management, user profile management, creating and updating cloud segments, and enabling or disabling nodes. The client 3 may be implemented as a web application (for example using Java™), a desktop application (for example using .Net™) and/or a native mobile application (for example on iOS™).

The client 3 includes a request interface 3*d* and a response interface 3*e* for communication with the application server tier 2, and a request interface 3*g* and a response interface 3*h* for communication with the device cloud layer 4

Application Server

The application server tier 2 comprises an inventory manager 2*a* which maintains a directory of the nodes, and a user sessions manager 2b. The application server tier 2 also includes a request interface 2c for communication with the request interface 3d, and a response interface 2d for communication with the response interface 3e.

Database

The database tier 1 interfaces with the application server tier 2, and comprises a database server 1a that maintains an inventory of mobile devices and nodes within the device cloud 4, as well as cloud segmentation information defining the definition of the device cloud into segments. The database server 1a also maintains user profile information, as well as a history of test executions and reports.

Device Cloud

The device cloud 4 comprises a network of nodes, subdivided into segments; this division may be on the basis of user profile, permissions, application grouping or application development phase, for example.

Structural Components

Figure 2:
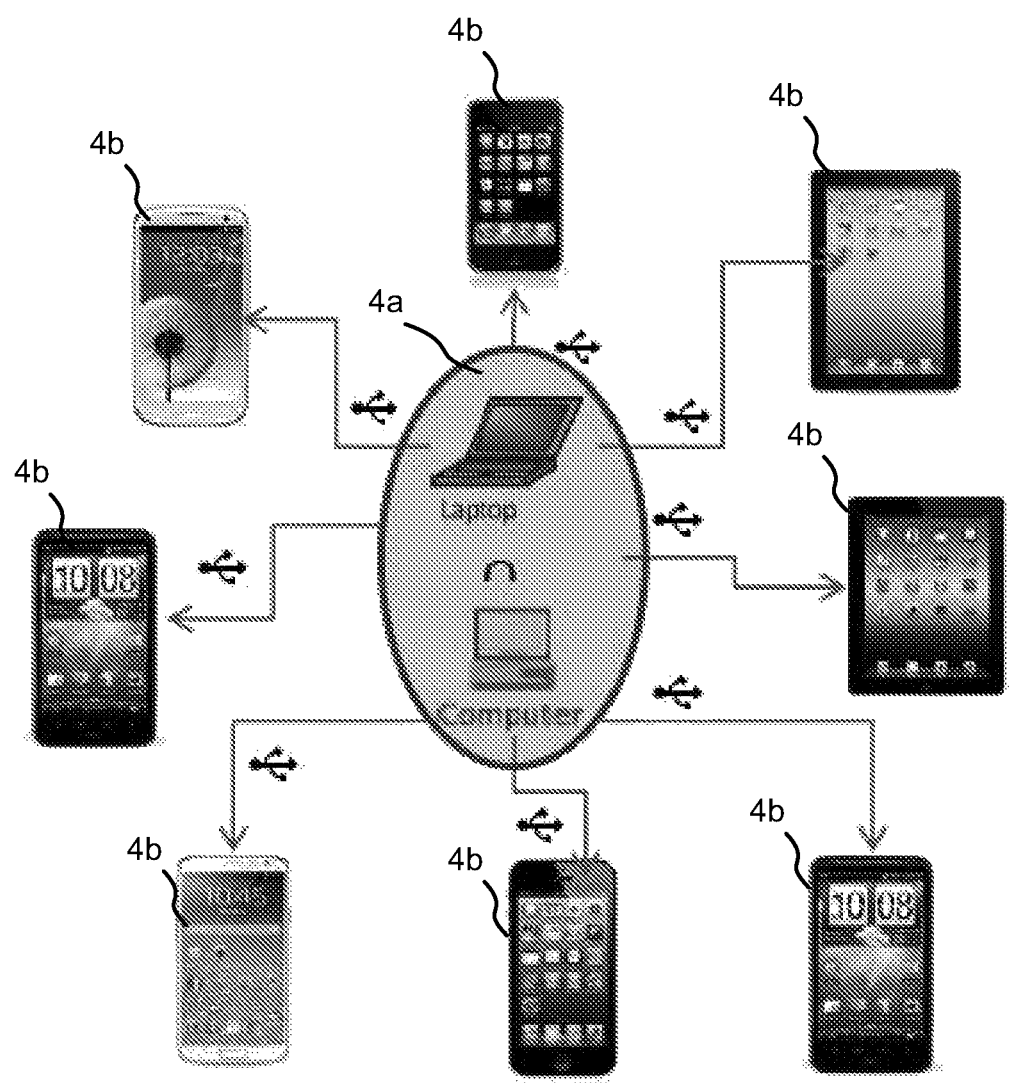
FIG. 2 is a schematic diagram of a test node in the system of FIG. 1.

As shown in FIG. 2, each node 4a comprises a general purpose computer, such as a desktop or laptop computer, that acts as a host for automated test execution on one or more mobile devices 4b connected locally to the node 4a. The local connections may be via a wired interface such as USB (Universal Serial Bus), or via a local wireless connection such as Bluetooth™ or Wi-Fi™. A network of such nodes 4a forms the device cloud 4. Each node runs an agent, which may be a Java™ RMI (Remote Method Invocation) server application. The agent manages requests and responses between client applications and mobile devices 4b.

Agent

Figure 3:
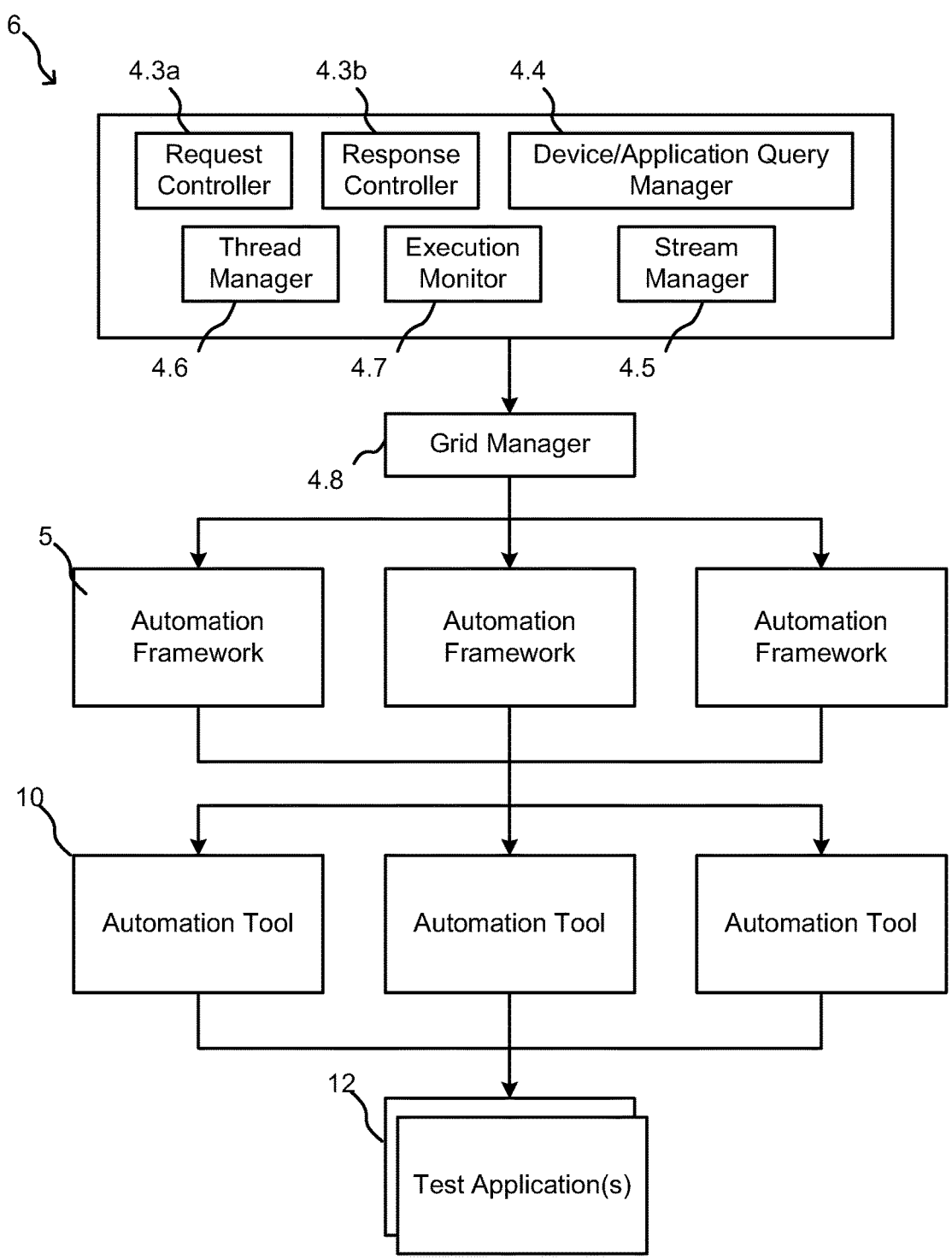
FIG. 3 is an object diagram of the test node and connected mobile devices of FIG. 2.

FIG. 3 shows the internal structure of the agent 6. The main objects within the agent 6 are described below. Request and Response Controllers 4.3a, 4.3b manage requests from clients 3 and other nodes 4a and pass on data for other objects within the agent 6. Device and Application Query object 4.4 handles queries from the client 3 about the state of devices 4b connected to the node 4a, the state being for example 'ready', 'in use', 'offline' etc. When a new automated test is configured or triggered, this object checks the device states and reports back to the requesting client 3.

Stream Manager object 4.5 processes screen snapshots from the mobile devices 4b and from desktops at the nodes 4a from reporter objects of the Framework 5 as described below. The snapshot images are then streamed to the requesting clients 3.

Thread Manager 4.6 creates and manages multiple test execution threads running Framework objects. There is one instance of Thread Manager 4.6 for every running agent 6. Once Thread Manager 4.6 creates a thread and hands it over to Execution Monitor 4.7, it goes back to a ready state to receive the next call from a client application.

Every agent has one Execution Monitor object 4.7 to manage the execution of automated tests across multiple threads. Execution Monitor 4.7 creates a Grid Manager object 4.8 and hands over control for test execution.

Grid Manager 4.8 is the master controller for all multi-threaded processes created by other objects and held by itself; it is the single point of contact between various executing threads.

Framework

Figure 4:
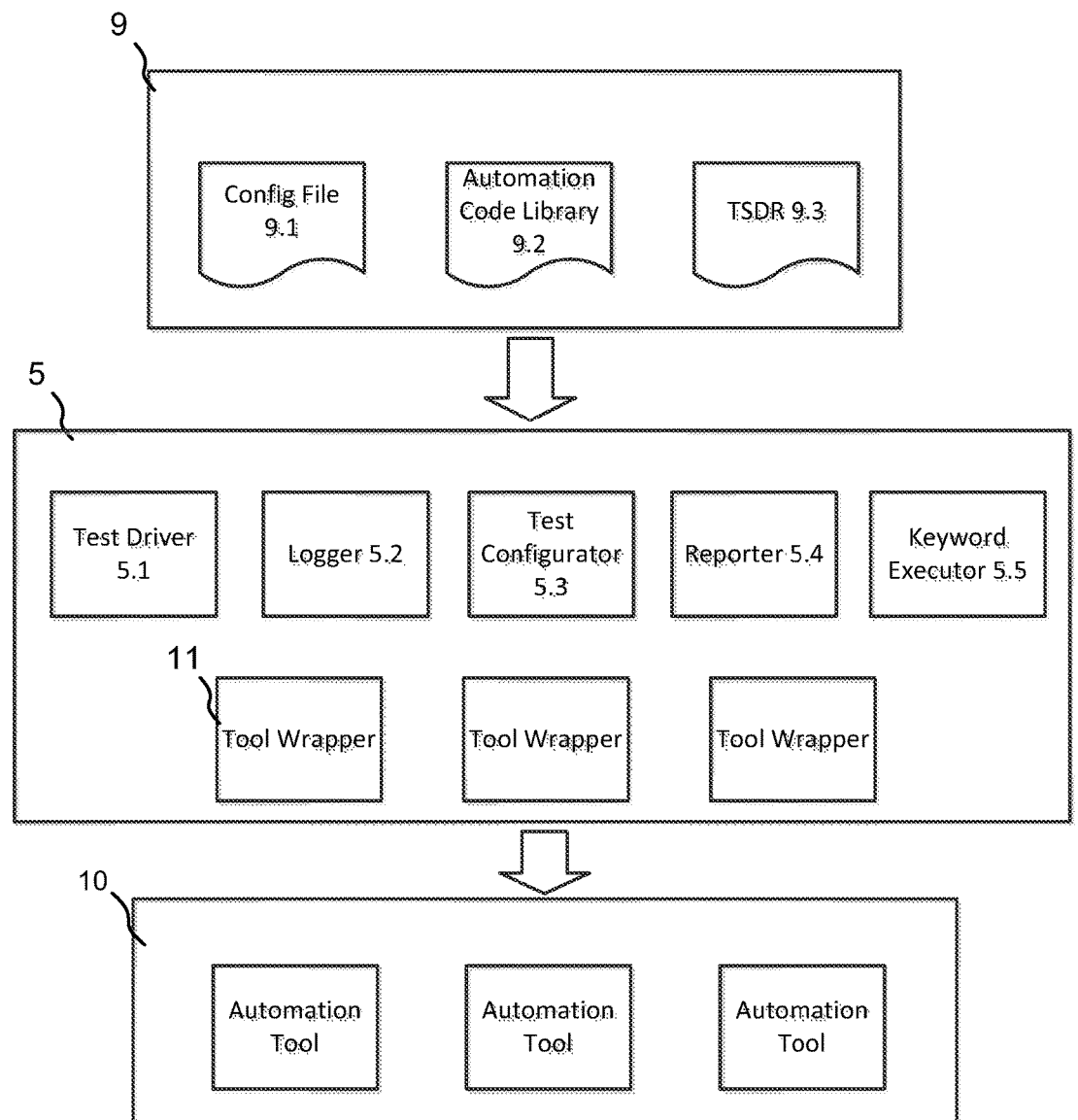
FIG. 4 is a diagram of a test automation framework object in the embodiment.

FIG. 4 is a diagram of the internal structure of a Framework object 5 within FIG. 3. Framework 5 is a test automation framework for design and development of test automation systems. This framework provides a tool-agnostic approach to automation development. The main function of Framework 5 is to manage execution of automation suites passed to it from an agent 6 and to continuously maintain contact with a client 3, including streaming information on the status of the running automation suite.

Each thread created by Thread Manager 4.6 creates an instance of Execution Monitor 4.7, which instantiates and runs a Framework object 5. Test Driver object 5.1 reads a configuration file 9.1, test specification/automation code library 9.2 and test data repository (TSDR) 9.3 from Test Spec and Data Container 9 to create a Keyword Executor object 5.5. Reporter object 5.4 facilitates generation of automated test reports and collection of proof of execution, based on a template. Reporter object 5.4 may stream screen snapshots from the node 4a to the requesting client 3.

The information passed to Framework 5 and the corresponding objects that process the information are shown below in Table 1:

TABLE 1

| Information | Information processor inside Framework 5 | Comments |
|---|---|---|
| Configuration file 9.1 | Test configurator 5.3 | Loads configuration file or parameters at run-time |
| TSDR (Test Specification and Data Repository) 9.3 | Keyword Executor 5.5 | Contains test specification in terms of sequence of Keywords and associated test data |
| Automation Code Library 9.1 | Keyword Executor 5.5 | Automation library contains code implementation |

Configuration File

Test Configurator object 5.3 holds the configuration file 9.1. When client 3 runs an automated test, this information is passed via Grid Manager 4.8 to Test Configurator object 5.3. Alternatively, Framework is able to work in a standalone mode, in which it fetches the configuration file 9.1. A sample configuration file 9.1 is shown in FIG. 5.

TSDR (Test Specification and Data Repository)

Framework 5 uses a Test Specification and Data (TSD) model to represent automated test suite design. This model combines test specification and test data into a single representation, as shown in the E-R (Entity-Relationship) diagram of FIG. 6. The automation developer/designer may construct the data source according to the TSD model. Test cases or scenarios are arranged in terms of a sequence of keywords (Scenario_Detail) and associated test data (TESTDATA).

An automated test or a test case is an ordered sequence of keywords invoked along with test data. The test specification provides the required structure to represent test cases/scenarios logically. Given an automation library, an automation developer needs to prepare a list of 'keywords' and associated test data and arrange them in sequence to form an automated test. If an automation library needs to be developed, the automation developer/designer may first analyse manual test cases/scenarios and develop a list of meaningful names/phrases referred as 'keywords'. As part of automation library development, the automation developer implements the keywords as methods or functions according to an automation tool syntax.

TSDR also allows organizing of automated tests in hierarchical forms for the ease of creation and management. The lowest level element in the hierarchy is always 'Keyword' (ordered sequences) mapping to an immediate higher level elements (test scenario or test case).

EXAMPLES

Application→Project→Modules→Test Scenarios→Test cases→Keywords and Test data
Application→Modules→Test Scenarios→Keywords and Test data.

Test Data is input data that is supplied to the application under test (AUT) 12, such as username, filepath, Group, country name etc. The input test data is used by the automated test according to logic or application behaviour to be validated via the test. A good automation programming practice mandates that all test data that an automated test uses shall be parameterized and supplied at runtime. Test data to be used during automated test execution will be associated logically with method/function/class that implements the test logic.

Important features of TSDR 9.3 include:
During execution TSDR is passed from client 3 to node 4*a*
The sequence of execution is specified in TSDR as a sequence of keywords
Keyword names need to be unique across different technology/tool layers
TSDR is queried for keywords to execute.
There may be at least two ways of using TSDR in Framework 5:
  Use Database specification (connection string) directly. One implementation of TSDR is use a relational database such as Oracle™ or MySQL™ for storing test specification and data.
  Use file formats such MS Excel, exported from a database.
Automated Test Suite An automated test suite comprises a test specification and test data, as part of the Framework test specification and data (TSD) model as described above, together with an automation code library, as shown in FIG. 7.

Generally, programming instructions to be executed against the application under test 12 in an automated way are specified under a unit referred as a function or method. Another way to look at "method" or "function" is considering them as elements containing the logic of automated tests.

Automated tests are implemented in code libraries and structured in classes and methods/functions (depending upon the programming language supported by the automation tool in question). To ease the learning and method of development, most automation tools support standard programming languages such as Java, VBScript, C#, JavaScript etc. In tools supporting procedural (or semi object oriented) languages the logic of tests is built into units commonly referred as "methods" or "functions". Even in tools that support object oriented languages such as Java or C++, the logic is still contained within "methods" or "functions" that are part of a "class". Eventually it is the "method" that has all that is required to be executed.

The test specification is a set of "keywords" invoked in a sequence. The test data comprises input data that is supplied to the application under test (AUT) such as username, filepath, group, country name etc. The input test data is used by the automated test to be validated according to logic or application behaviour.

The test automation code library is a software library containing executable or interpretable code that performs automated execution of target mobile or non-mobile applications 12. This library maps the test specification model (e.g. keywords) and test data.

The test automation library can be a dynamic linked library (DLL), SQL script, PERL/Python script or library, Javascript etc. Via a reflection technique, Framework can invoke the automation method/function contained in the library. If the automation tool does not expose an API to invoke keywords, Framework wrapper classes/methods may need to be developed to cater to specific tools.

Framework Structural Components

Test Driver 5.1 is the entry point for Framework 5 to begin automation execution; it initiates reading and loading of configuration files 9.1, then loads the TSDR 9.3 into an in-memory structure and starts processing TSDR elements. This eventually calls the automation tool runtime system to execute specified keywords in the order mentioned in TSDR 9.3.

Test Configurator 5.3 reads and loads the configuration file 9.1 into memory. Test Configurator 5.3 has a method called "getProperty" using which automation code can fetch the details of the test.

The following is a sample list of properties contained in a sample configuration file 9.1. These properties are global for the session of executing tests. The automation developer can add new properties and specify required values as needed depending upon the automation requirements.
  ActiveDevice (Target mobile device)
  ToolWrapperPath
  TestEnvironmentName
  ScreentimeOut
  URL (file system independent resource locator for automation code library)

Keyword Executor 5.5 is the object responsible for managing the final stage of automation execution. There is a method in this object called "InvokeMethodByReflection" that has following signature and takes 3 parameters:
  1. Keyword name to be executed (read from TSDR)
  2. Tool Wrapper—a component that invokes the appropriate runtime object of the automation tool that executes the method or function mapped to a keyword. Programming implementation of the method is inside the automation code library
  3. Dataset—data used by the keyword being executed The following is the logic of how Keyword Executor 5.5 processes the keywords.

```
For each keyword
    Get keyword name
    Prepare Data required for the keyword
    For each Automation code library loaded in memory
        Search the keyword name in loaded automation code libraries
        If Found then Ask the Tool wrapper to execute the method
        Exit For loop
    End For {Automation code Library}
    Error: keyword implementation not found
End For {keyword}
```

The Method name is a simple English word/phrase such as "ValidatePasscode". This method name per se does not identify or specify the actual automation tool runtime object to be used. The technique of "reflection" allows names/phrases to be used as programming instructions. Thus the logic of Framework 5 allows an automation tool and corresponding code library to be defined at keyword level. This association between keyword and automation tool to use is not specified in TDSR 9.3. Keyword Executor object 5.5 determines the association at runtime using tool wrappers 11. It is possible to call keywords (programmatically method or function) referring to any number of automation tools in single session. Since there is a flexibility to associate automation tools and related libraries at keyword level, this provides tool independence and also chaining of automation across mobile and non-mobile applications.

Tool wrapper 11 is an "integrator" of various automation tools into Framework 5. Tool wrapper 11 is invoked by Keyword Executor 5.5. Tool wrappers 9 may be developed for standard automation tools. For example, for automation tools having Java API's, Tool wrapper 11 would perform following tasks:

Read URL property (from config file) to locate automation library (Java Jar file)

Using standard Java API "URLClassLoader" (java.net package)—load the library in memory and create JRClassLoader With JRClassLoader object—invoke required method through Runtime Framework of the automation tool 10 (For example runtime system for SeeTest™ tool is "ImageClient.jar")

Depending upon the nature of the automation tool, the tasks performed by tool wrapper might vary from the above example.

Reporter object 5.4 facilitates generation of automated test reports and execution proof collection based on a template. In addition to this, it does the job of streaming screen snapshots from node 4a to requesting clients 3. Inside a function/method of an automation code library, a call to Reporter object 5.4 is made to perform actions such logging test information, taking screen shots etc. Through these calls, the status of an executing automation test is continuously passed to clients 3.

Framework Control & Information Flow

Figure 8:
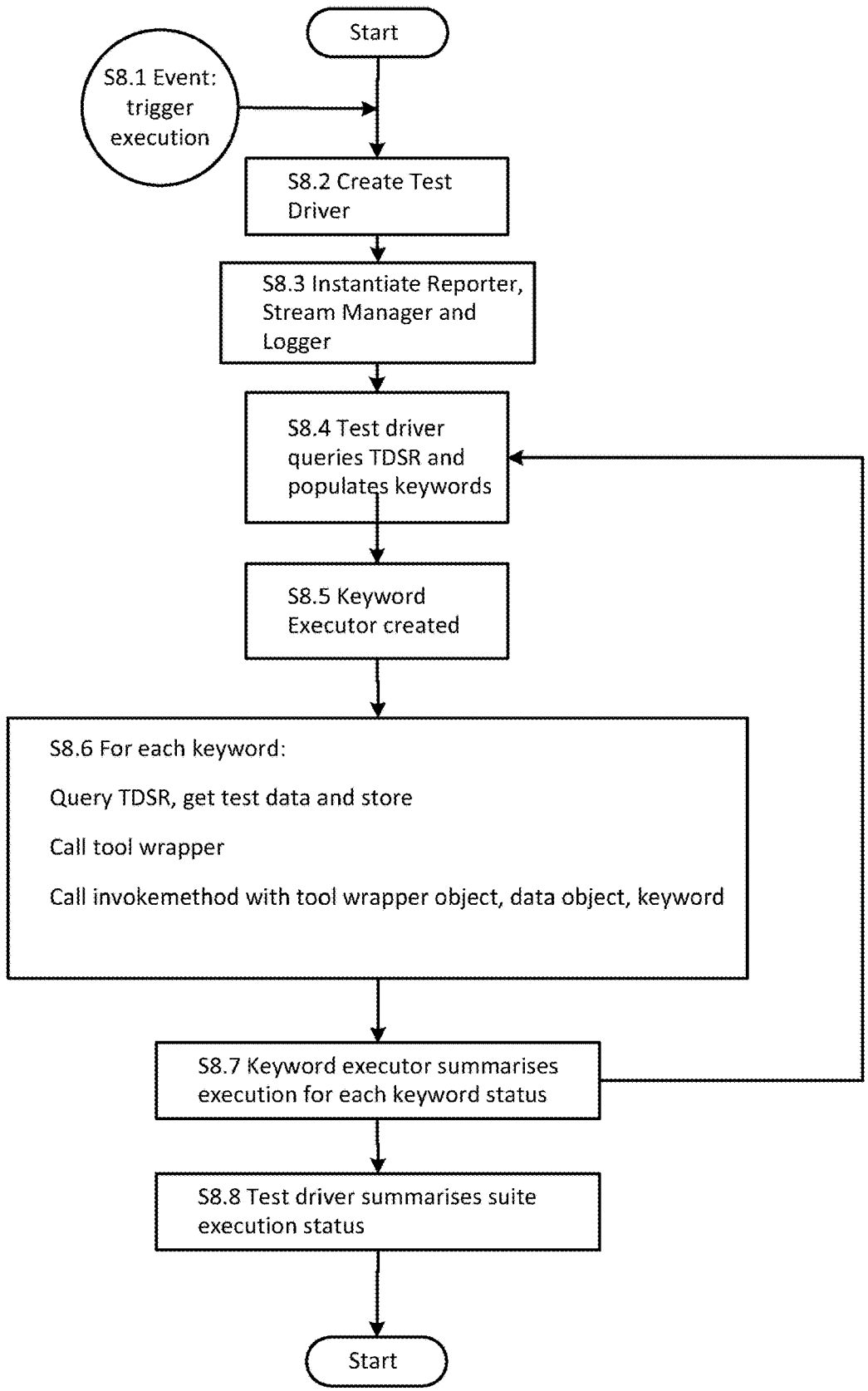
FIG. 8 is a flow diagram of the operation of the test node of FIG. 2.
Figure 9:
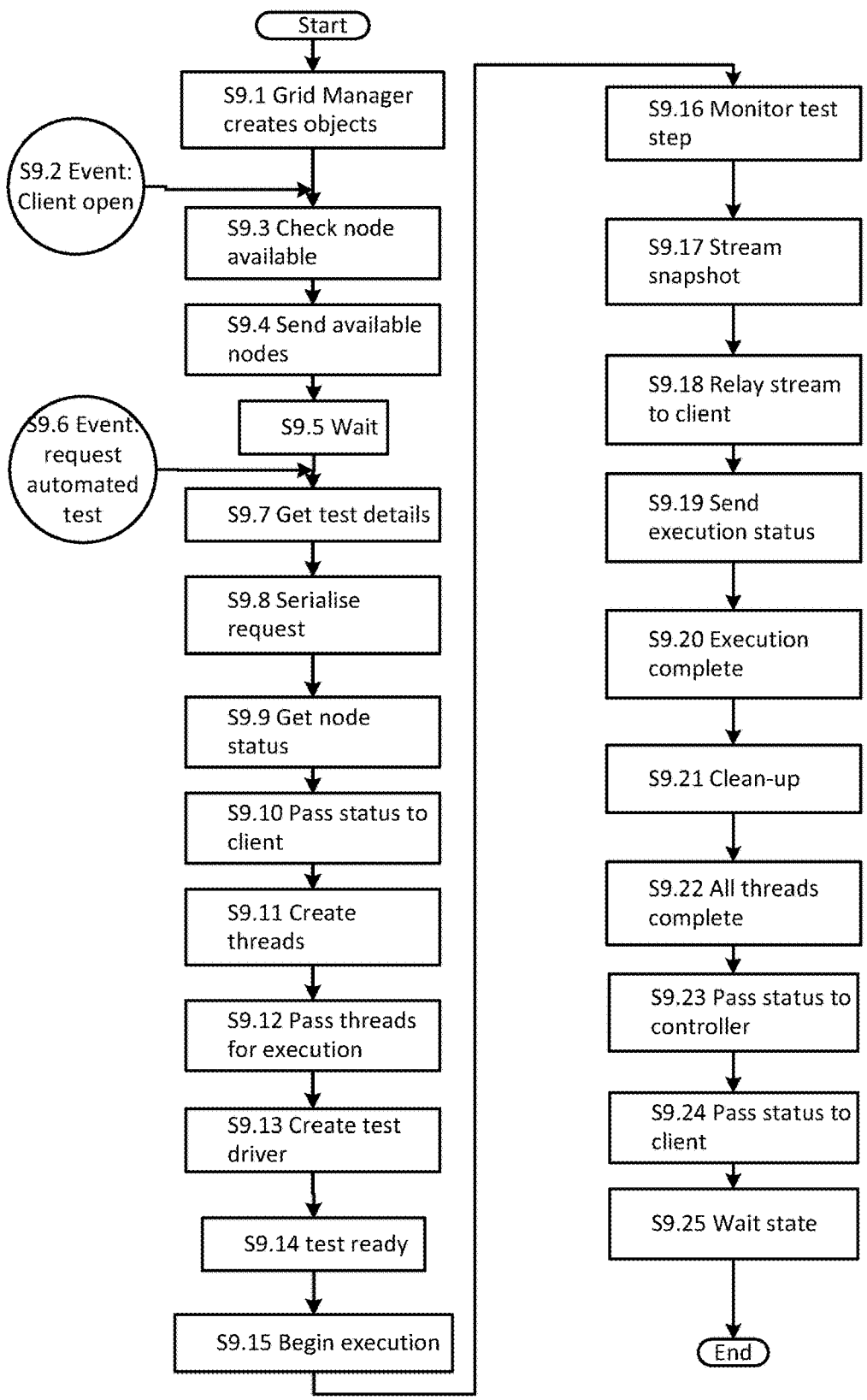
FIG. 9 is a flow diagram of the operation of a Framework object in the embodiment.

An example of Framework control and information flow is shown in FIG. 8. At step S8.1, test execution is triggered. At step S8.2, Test Driver object 5.1 is created and the config file 9.1 is loaded into memory. At step S8.2, Reporter 5.4, Stream Manager 4.5 and Logger 5.2 objects are instantiated. At step S8.3, Test Driver 5.1 queries the TDSR 9.3, populates keywords into the Keywords object and iterates through the keywords. At step S8.4, Keyword Executor 5.5 is created and the invokeMethodByReflection Method is called with the keyword.

At step S8.5, for each keyword: the TDSR 9.3 is queried to get test data for the current iteration and store it in a Data object; Tool Wrapper(s) 11 are called as specified in the Configurator object 5.3, so as to load the corresponding automation library into memory; and invokemethod is called with the parameters Tool Wrapper object 9, Data object and Keyword.

At step S8.6, Keyword Executor 5.5 summarizes execution for each keyword status and returns it to Test Driver 5.1. Operation then returns to step S8.3 until the last keyword has been processed. After the last keyword has been processed, at step S8.7 Test Driver 5.1 summarizes the suite execution status and reports the summary in a Report object.

For example, in a case where a TDSR has three keywords each targeting a specific technology layer, implemented using three different automation tools, the following Table 2 illustrates details of a multi-tier passcode validation test scenario and other related information.

TABLE 2

| Keywords | Automation Tool (Sample automation code library name) | Application under Test (AUT) or Target platform | Automation Tool runtime object used in Tool wrapper | Data exchanged between Tools |
|---|---|---|---|---|
| ValidatePasscodeApp | SeeTest (App_Android.jar) | Native Mobile App or Mobile Web Application | "Client" | Password Captured by SeeTest |
| ValidatePasscodeWeb | QuickTest Pro (Web_Passcode.vbs) | Desktop or Web Application | "QTPro" | Password Captured by SeeTest + Password Captured by Web Application |
| ValidatePasscodeService | GreenHat Tester (Services_GHT.proj) | Web service, middleware component or database | "RunTest" | All above + Password captured at Middle tier (Services) |
| ConsolidateAndReport | None | N/A | N/A | Compare all three passcodes and report if all of them match with each other. |

Since there are three different automation tools involved in above example, there will be three automation code libraries developed in the respective tools. There will be one TSDR export (e.g. in an MS-Excel file) and one Configuration file with all the required details. The node 4a executing this multi tool test will have runtime systems/packages of all three automation tools such that Tool wrappers 11 can call them.

This test can be developed and executed with Framework 5 connected to agents, or standalone mode. Framework 5 iterates through TSDR 9.3 and executes each keyword as per the sequence.

Agent Operation

Figure 10:
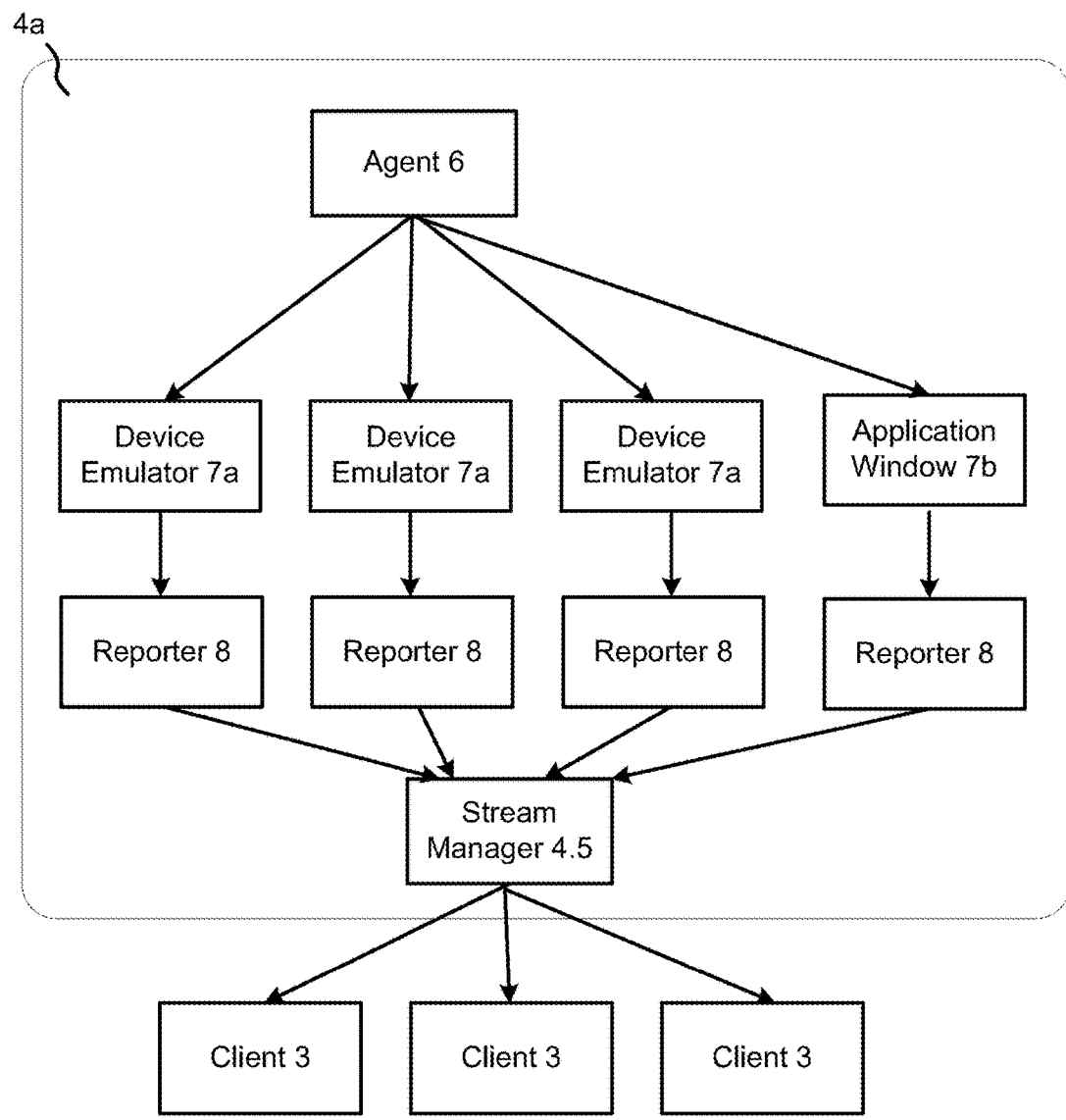
FIG. 10 is a schematic diagram of stream manager logic in the embodiment.
Figure 11:
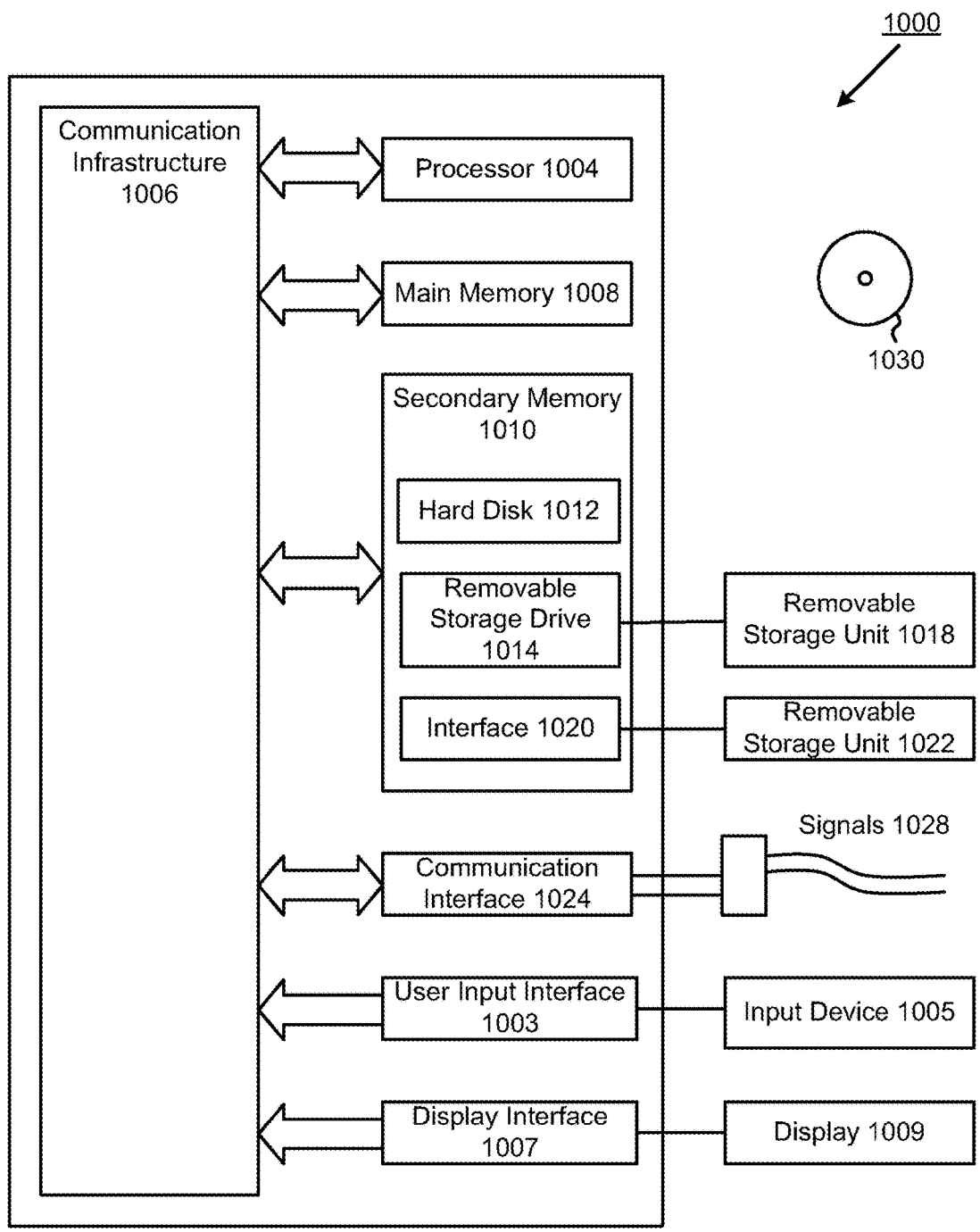
FIG. 11 is a diagram of a computer system for use in the embodiment.

FIG. 10 is a flow diagram of the operation of the agent 6, as described below. At step S9.1, Grid Manager 4.8 creates the following objects:

1. Device/Application Query Manager 4.4
2. Request Controller 4.3*a*
3. Response Controller 4.3*b*
4. Stream Manager 4.5
5. Thread Manager 4.6

At step S9.2, as an external event, a client application is opened. At step S9.3, Device/Application Query 4.4 receives a request to check node availability from the client application. At step S9.4, Device/Application Query Manager 4.4 sends a response indicating available nodes 4*a*, optionally filtered on the basis of user access rules. At step S9.5, Grid Manager 4.8 enters a wait state.

At step S9.6, as an external event, a client 3 requests execution of an automated test. At step S9.7, Request Controller 4.3*a* gets the request with a list of devices/browsers/applications to be tested, and the testing suite and test data to be used. At step S9.8, Request Controller 4.3*a* serializes the request XML into a Test Job object. This object holds all information about the test (such as number and types of devices, applications, test suite path, test data) that is requested to be run. From this object, Test suite binary and Test data binary portions are de-serialized into files and stored on configured paths on the node.

At step S9.9, Grid Manager 4.8 queries Device/Application Query object 4.4, gets the latest information on node status from the node 4*a* itself (stored in an RMI (Remote Method Invocation) registry) and passes it onto to Response Controller 4.3*b*. At step S9.10, Response Controller 4.3*b* passes the information to the requested client 3, which gets updated status information about the node(s) 4*a* while Grid Manager 4.8 continues to prepare for test execution.

At step S9.11, Grid Manager 4.8 passes Test Job object to Thread Manager 4.6 to create the number of threads depending upon the number of mobile devices 4*b* or applications included (for example number threads created=number of devices/applications specified in Test Job). At step S9.12, Thread Manager 4.6 creates thread(s) and passes the thread handle(s) to Execution Monitor 4.7. For each thread there is an Execution Monitor 4.7 object attached.

At step S9.13, for each Execution Monitor 4.7, a Test Driver object 5.1 is created which fetches details about device, application, test suite and test data (these last two are read from a file). At this point, Reporter 5.4, Stream Manager 4.5 and Logger 5.2 objects are instantiated by Test Driver 5.1, which then parses Test data sheet and separates test data and test specification. Test data is stored in a TDSR object whereas test (step) specification is stored in Keywords object. At step S9.14, the test is ready to be executed.

At step S9.15, Keyword Executor object 5.5 begins the test execution by iterating following actions:

1. Get test step from Keywords object
2. Call respective automation method/function from test suite via reflection.

At step S9.16, Keyword Executor 5.5 monitors each test step (i.e. automation tool related code statements) triggered and collects each statement's execution status and summarizes status and reports to Reporter 5.4. At step S9.17, Step Executor object 5.5 streams the execution window's snapshot back to Stream Manager 4.5, Reporter 5.4 and Logger objects. At step S9.18, Step Executor object 5.5 streams the execution window's snapshot back to the Stream Manager 4.5, Reporter 5.4 and Logger.

At step S9.19, Execution Controller 5.5 summarizes the execution status and passes it back to Test Driver 5.1. At step S9.20, Test Driver 5.1 summarizes the suite execution status and communicates to the Execution Monitor 4.7 that the execution is complete. At step S9.21, Execution Monitor 4.7 cleans up memory for its assigned thread and communicates to the Thread Manager 4.6 about test completion status. This releases the device/browser/application for new execution and marks the same as "available".

At step S9.22, once all Execution Monitor objects 4.7 return "complete" status, Thread Manager 4.6 passes information back to Grid Manager 4.8. At step S9.23, Grid Manager 4.8 passes the information to the Response Controller 4.3*b*. At step S9.24, Response Controller 4.3*b* passes the information back to the requesting client 3. At step S9.25, Grid Manager 4.8 goes back into a wait state, ready for the next execution request from a client application. Optionally, the agent 5 may then shut down.

Advantages

Advantageous functions which may be provided by the above architecture and components will now be described.

Independence from Test Automation Tool

The automated testing system of the embodiment may work with a variety of different test automation tools; it is able to execute various automation suites, developed using third party test automation tools and integrate them in an end to end chain via the Framework.

An automation suite, in a generic sense, consists of code library, test data, graphic user interface controls (GUI) map, configuration file etc. An automation code library may be developed by an automation engineer using a specific automation tool. The automation library along with test data, GUI map and configuration file(s) is executed by a module of an automation tool, usually referred as "test/automation runner". For non-GUI applications such as Web services, database tests do not need a GUI map. Thus, with a traditional automation approach, a single piece of software provides features to develop an automation suite (mainly an automation code library) and also features to run the automation suite. As a consequence, an automation suite developed in one automation tool cannot be run by another automation tool.

The Framework 5, embedded in agent 6, provides a layer that facilitates interoperability to enable automation suites developed in any automation tool to be executed by the agent 6. It is important to note that the Framework 5 is not an automation tool in itself but it is an execution engine. It is a special type of execution system that works with automation suites developed in any automation tool through features described below.

The following features of the agent 6 enable tool independence:

data model combining Test Specification and Test Data

Invocation of keywords through reflection, a programming technique.

The automated test suites 5.7 need to be structured in the Framework format. When the automation tool exposes API's for the use of the Framework, no specific wrapper classes need to be developed for supporting a specific automation tool.

The automated test suites need to be structured in the Framework format. The process of structuring involves creating a common "Test Specification and Data Repository (TSDR). This serves as an interface between the Framework 5 and specific automation tool in which automation code library is developed. During execution, the Framework queries and loops through TSDR to generate an array of Keyword calls and associated data. This array of method calls will be executed by runtime object of automation tool called Tool wrapper.

Table 3 below lists supported test automation tools/technology frameworks in the Framework.

TABLE 3

| Technology Tier | Test Automation Tool |
|---|---|
| Mobile Native/Web App | SeeTest ™/Perfecto Mobile ™/ZapFix ™ |
| GUI-web or desktop | QTP ™, Rational Function Tester ™ |
| Web service/Middleware | GH Tester ™, SoapUI, HP Service Test ™ |
| Database | Test automation script implemented via ODBC API |
| Mainframe-CICS GUI screens | QTP ™ via terminal emulation |
| Others | Empirix Hammer ™ (IVR) |

Integration Between Mobile and Non-Mobile Tests

The automated test system supports automated test execution of mobile and non-mobile applications such as GUI, middleware, services, database and mainframe applications. The Framework offers the facility to link automated execution across tools and technology layers in a single session.

The automated test system may run end to end automated tests between mobile and non-mobile applications, using the following capabilities:

Ability to call any third party test automation API in a platform-independent format in an easy-to-understand syntax.

Ability to share the test data (input and output) between test automation tools, processes and technology tiers in such a way that the same input can be used across the application layers (and test automation tools). This allows output of one process or tool to be used as input to any other process or tool.

Framework implements these capabilities as follows:

Using execution of "method call" through reflection: any form of text based method can be called to execute a method, function or procedure (referred as "keyword") at run time. This technique enables the agent to call mobile test automation suite and non-mobile test automation suite methods at runtime seamlessly by using a method name string as if it were a native test automation method/function call. These automation suite methods are specified as keywords in the TDSR object 9.3.

TSDR serves as read/write data repository that can be accessed by all processes run by Framework 5. Using TSDR it is possible to share and store the data for other application's use without modifying the framework code and test automation function library. Automation method calls across the automation tools can access this shared data structure enabling linking of automation execution between two or more technology tiers.

While TSDR is a logical model that combines test data and keywords, TSDR is implemented in Framework 5 as a dictionary object called "Data". This object holds both keyword names and associated test data. Test data is held as name-value pair. There could multiple such name-value pairs associated with a given keyword. This object is passed by reference to every "InvokeMethodByReflection" method call. All data exchange that happens during the method call is read from and written to the reference of Data object.

The following is an example of how a data value is read from "Data" object. Here "PhoneNo" is the field name that is associated with a specific keyword.

String PhoneNumber=Data ("PhoneNo")

The data values that need to be passed on between two keywords (two different automation tool calls) need to be written to Data object.

In following example a data value that is retrieved and saved during one keyword call is preserved so that same can be used in any subsequent method calls.

Float CurrentBalance=Account.Get BalanceFromGUI( )//Extract at runtime from Application Data ("CurrBalance")=CurrentBalance//Assign to Data object Thus by passing data values between two method/keyword calls, automation execution between two different tools (mobile and non-mobile) can be chained/integrated in a single session.

Dynamic Scaling

Dynamic scaling is the ability to add or remove a node on demand. This is achieved in the device cloud 4 through an RMI server and discovery mechanism, implemented in the agent 6. To add a new node, the agent 6 needs to be installed on a node 4a. Once the agent 6 is installed, it registers in the RMI registry and opens a port for discovery by client applications and other nodes.

The new node 4a will be automatically detected by any running client application through a query to the RMI registry and the node 4a and connected devices 4b will be visible to all users having access to the relevant segment. Alternatively, a user having access to the same segment can manually add the node 4a by specifying the node name or IP address through the client application. This feature of dynamic scaling is independent of the operating system running on the nodes 4a.

In case of any problems, a specific node can be taken off the segment (or an entire segment can be taken off the cloud) by shutting down the agent 6 on a specific node 4a, for example under the control of a client 3. In this way, the agent 6 offers a loose coupling between the client application and the node 4a. System administration help or system/hardware shutdown is not required for adding or removing a node 4a. This makes it easy for the capacity of the device cloud to be dynamically varied.

Real-Time Display Streaming

In order to monitor the automated test execution as an end user, a facility to stream the image of a mobile device screen or application window is required. As shown in FIG. 7, every Framework thread (one per device or desktop application being executed) has a Reporter object 8 of the agent 6 allocated to it. The Reporter object 8 takes a screen shot of a device emulator window 7a (this feature is provided by the test automation tool for the mobile device 4b), or an application window 7b of a non-mobile application running at the node 4a. The images are stored on a hard disk of the node or any configured network location. The time lag between two screenshots is configurable in the client.

The images taken by Reporter objects 8 may be used in either of two ways. One is to add them in Test report as screen shots and other is to pass them onto the Stream Manager object 4.5 as a byte stream. The client 3 queries the Stream Manager object 4.5 of the agent 6 to get the latest screenshot of the device or application window 7a, 7b at regular time intervals.

Segmentation of Nodes Based on Development Phase

The device cloud 4 may be sub-divided into segments of nodes 4a based on various parameters that allow flexible use and customization for various needs. These node segments are logical partitions that users can use for custom needs such as SDLC phases or geographical locations for teams, pre-configured set of devices or platforms etc. The database server 1a stores the following information about segments:

Name of the segment

User groups associated and respective access control

SDLC Phase information and Logical sequence

Device/Platform Matrix (OS-Browser combination)

Applications under Test

Test data/Test specification

Test automation suites.

When a user logs into the client 3, the user automatically gets access to segments mapped the user/group profile and application SDLC Phase. The segments can also be assigned/mapped to teams so that work of one team/phase does not impact the work of other teams.

Segment information stored in the database 1 is not static and gets updated when a user uploads test suite or applications (e.g. mobile apps) to nodes 4a. One agent 6 can trigger the test execution from another agent 6 in another segment. This feature allows automated test execution across SDLC phases.

The Application Server 2 holds information about the logical sequence of SDLC phases for product release or application. This information can be used to automatically trigger test automation suites in a sequential order, without any explicit user intervention. For instance, a node 4a from a segment mapped to component integration testing phase (CIT) can trigger tests on a node 4a on another segment mapped to system integration testing (SIT) phase. This automated trigger is possible as any two nodes 4a can communicate and pass data between them through agents 6 running on them.

Glossary

Multi-threaded—a programming technique, where multiple threads exist within the context of a single process. These threads share the process' resources, but are able to execute independently. The threaded programming model provides developers with a useful abstraction of concurrent execution. However, perhaps the most interesting application of the technology is when it is applied to a single process to enable parallel execution on a multiprocessing system QTP™—HP QuickTest Professional software provides functional and regression test automation for software applications and environments. Part of the HP Quality Center tool suite, HP QuickTest Professional can be used for enterprise quality assurance.

Segments—a computer segment consists of a set of loosely connected or tightly connected computers that work together so that in many respects they can be viewed as a single system.

Segmentation—an act or process of splitting a device cloud into meaningful segments with each being a cloud segment or cloud layer.

SeeTest™—test automation tool for mobile platforms—iOS, Android, Blackberry and Windows Phone.

SDLC—software development process, or Software Development Life Cycle in systems engineering, information systems and software engineering, is a process of creating or altering information systems, and the models and methodologies used to develop these systems. In software engineering, the SDLC concept underpins many kinds of software development methodologies. These methodologies form the framework for planning and controlling the creation of an information system RMI—an API that performs the object-oriented equivalent of remote procedure calls (RPC), with support for direct transfer of serialized Java objects and distributed garbage collection.

TDStruct—Test Data collection, which has unique field names and values. This is a wrapper that connects to an external data source.

Computer Systems

The entities described herein such as database 1, application server 2, clients 3, nodes 4a and devices 4b may be implemented by computer systems such as computer system 1000 as shown in FIG. 10. Embodiments of the present invention may be implemented as programmable code for execution by such computer systems 1000. After reading this description, it will become apparent to a person skilled in the art how to implement the invention using other computer systems and/or computer architectures.

Computer system 1000 includes one or more processors, such as processor 1004. Processor 1004 may be any type of processor, including but not limited to a special purpose or a general-purpose digital signal processor. Processor 1004 is connected to a communication infrastructure 1006 (for example, a bus or network). Various software implementations are described in terms of this exemplary computer system. After reading this description, it will become apparent to a person skilled in the art how to implement the invention using other computer systems and/or computer architectures.

Computer system 1000 also includes a user input interface 1003 connected to one or more input device(s) 1005 and a display interface 1007 connected to one or more display(s) 1009. Input devices 1005 may include, for example, a pointing device such as a mouse or touchpad, a keyboard, a touchscreen such as a resistive or capacitive touchscreen, etc. After reading this description, it will become apparent to a person skilled in the art how to implement the invention using other computer systems and/or computer architectures, for example using mobile electronic devices with integrated input and display components.

Computer system 1000 also includes a main memory 1008, preferably random access memory (RAM), and may also include a secondary memory 610. Secondary memory 1010 may include, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018 in a well-known manner. Removable storage unit 1018 represents a floppy disk, magnetic tape, optical disk, etc., which is read by and written to by removable storage drive 1014. As will be appreciated, removable storage unit 618 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that previously found in video game devices), a removable memory chip (such as an EPROM, or PROM, or flash memory) and associated socket, and other removable storage units 1022 and interfaces 1020 which allow software and data to be transferred from removable storage unit 1022 to computer system 1000. Alternatively, the program may be executed and/or the data accessed from the removable storage unit 1022, using the processor 1004 of the computer system 1000.

Computer system 1000 may also include a communication interface 1024. Communication interface 1024 allows software and data to be transferred between computer system 1000 and external devices. Examples of communication interface 1024 may include a modem, a network interface (such as an Ethernet card), a communication port, a Personal Computer Memory Card International Association (PCMCIA) slot and card, etc. Software and data transferred via communication interface 1024 are in the form of signals 1028, which may be electronic, electromagnetic, optical, or other signals capable of being received by communication interface 1024. These signals 1028 are provided to communication interface 1024 via a communication path 1026. Communication path 1026 carries signals 1028 and may be implemented using wire or cable, fibre optics, a phone line, a wireless link, a cellular phone link, a radio frequency link, or any other suitable communication channel. For instance, communication path 1026 may be implemented using a combination of channels.

The terms "computer program medium" and "computer usable medium" are used generally to refer to media such as removable storage drive 1014, a hard disk installed in hard disk drive 1012, and signals 1028. These computer program products are means for providing software to computer system 1000. However, these terms may also include signals (such as electrical, optical or electromagnetic signals) that embody the computer program disclosed herein.

Computer programs (also called computer control logic) are stored in main memory 1008 and/or secondary memory 1010. Computer programs may also be received via communication interface 1024. Such computer programs, when executed, enable computer system 1000 to implement embodiments of the present invention as discussed herein. Accordingly, such computer programs represent controllers of computer system 1000. Where the embodiment is implemented using software, the software may be stored in a computer program product 1030 and loaded into computer system 1000 using removable storage drive 1014, hard disk drive 1012, or communication interface 1024, to provide some examples.

Alternative embodiments may be implemented as control logic in hardware, firmware, or software or any combination thereof.

Alternative Embodiments

Alternative embodiments may be envisaged, which nevertheless fall within the scope of the following claims.

The invention claimed is:

1. An automated application test system, comprising:
    a. a plurality of clients providing test interfaces to corresponding users, and
    b. a network of test hardware nodes connected to the clients;
    wherein each said test hardware node comprises:
    c. one or more test devices locally connected to the test hardware node; and
    d. an agent arranged to execute one or more test applications on the locally connected test devices in accordance with requests from the clients;
    wherein said agent is arranged to link execution of a test application with execution of another test application executed by another said agent on another said test hardware node,
    wherein each said agent is operable with one or more test automation tools with different automation code libraries, the agent including an automation framework operable independently of the automation code libraries of the automation tools.

2. The test system of claim 1, wherein each said client includes a test creation function for configuring automated execution of respective test applications on specified ones of the test devices.

3. The test system of claim 1, wherein each said client includes a monitor function for monitoring the execution of respective test applications on specified ones of the test devices.

4. The test system of claim 1, wherein said agent is arranged to manage a plurality of concurrent executions of respective test applications on the locally connected test devices.

5. The test system of claim 1, wherein said agent is arranged to provide a stream of snapshot images of respective test applications executed on the locally connected test devices.

6. The test system of claim 1, including an application server connected to the clients, the application server being arranged to access a directory of said hardware nodes.

7. The test system of claim 6, wherein the application server is arranged to maintain one or more variable segment definitions, each defining a subset of said test hardware nodes, such that a test application may be run on a segment specified by one or more of the clients.

8. The test system of claim 7, wherein the segment definitions are definable from one or more of the clients.

9. The test system of claim 7, wherein the segment definitions are definable with respect to an SDLC phase of one or more of the test applications.

10. The test system of claim 1, wherein the linked said test applications comprise a mobile application and a non-mobile application.

11. The test system of claim 1, wherein the test hardware nodes comprise general purpose computers.

12. The test system of claim 1, wherein the test devices comprise mobile devices.

13. The test system of claim 1, wherein the clients comprise one or more of: a web application, a desktop application and a mobile application.

* * * * *